(12) United States Patent
Kennedy et al.

(10) Patent No.: US 7,837,141 B2
(45) Date of Patent: Nov. 23, 2010

(54) REACTION DRIVE ROTOR/WING VARIABLE AREA NOZZLE

(75) Inventors: Dennis K. Kennedy, Mesa, AZ (US); Neal W. Muylaert, Apache Junction, AZ (US); William J. Bigbee-Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 11/387,189

(22) Filed: Mar. 22, 2006

(65) Prior Publication Data

US 2009/0206208 A1    Aug. 20, 2009

(51) Int. Cl.
B64C 27/24 (2006.01)
B05B 1/26 (2006.01)
B64C 27/615 (2006.01)

(52) U.S. Cl. ........................ 244/7 A; 244/198; 239/508; 239/511; 239/513; 416/20 R; 416/23; 415/82

(58) Field of Classification Search ............... 60/230, 60/235, 242, 771; 244/7 A, 39, 198; 416/20 R, 416/23; 415/82
See application file for complete search history.

(56) References Cited

U.S. PATENT DOCUMENTS

| | | | | | |
|---|---|---|---|---|---|
| 1,087,006 | A | * | 2/1914 | Fitzsimons | 239/507 |
| 2,667,226 | A | * | 1/1954 | Doblhoff | 416/20 R |
| 2,940,252 | A | * | 6/1960 | Reinhart | 239/265.17 |
| 3,031,156 | A | * | 4/1962 | Foster | 244/15 |
| 3,045,947 | A | * | 7/1962 | Bertin et al. | 244/12.1 |
| 3,128,063 | A | * | 4/1964 | Kaplan | 244/207 |
| 3,171,379 | A | * | 3/1965 | Schell, Jr. et al. | 114/278 |
| 3,174,709 | A | * | 3/1965 | Alderson | 244/23 D |
| 3,248,878 | A | * | 5/1966 | Clark et al. | 60/229 |
| 3,262,270 | A | * | 7/1966 | Beavers | 60/226.2 |
| 3,262,271 | A | * | 7/1966 | Beavers | 60/226.2 |
| 3,332,644 | A | * | 7/1967 | Whittley | 244/207 |
| 3,456,904 | A | * | 7/1969 | Dorand | 244/207 |
| 3,831,887 | A | * | 8/1974 | Fosness | 244/207 |
| 3,860,200 | A | * | 1/1975 | Petrushka | 244/207 |
| 3,920,203 | A | * | 11/1975 | Moorehead | 244/207 |
| 4,301,980 | A | * | 11/1981 | Bradfield et al. | 244/12.5 |
| 4,505,443 | A | * | 3/1985 | Bradfield et al. | 244/12.5 |
| 4,519,543 | A | * | 5/1985 | Szuminski et al. | 239/265.19 |
| 4,550,877 | A | * | 11/1985 | Szuminski | 239/265.35 |
| 4,591,097 | A | * | 5/1986 | Thayer | 239/265.29 |
| 4,605,169 | A | * | 8/1986 | Mayers | 239/265.29 |
| 4,720,901 | A | * | 1/1988 | Johnson et al. | 29/890.01 |

(Continued)

*Primary Examiner*—Tien Dinh
*Assistant Examiner*—Joseph W Sanderson
(74) *Attorney, Agent, or Firm*—Toler Law Group (57) ABSTRACT

In an exemplary variable area nozzle, a fixed duct section has an inlet and an outlet oriented approximately perpendicular to the inlet. A controllable nozzle member is disposed adjacent the outlet of the fixed duct section. The controllable nozzle member has an area that is adjustable to maintain a substantially constant nozzle pressure ratio. The controllable nozzle member may include first and second flap doors hinged and pivotable in opposite directions between an open position and a closed position and that also may be hinged and pivotable in a same direction so thrust from gas exiting the nozzle is vectorable. When disposed in rotor tips of an aircraft capable of rotary wing flight and fixed wing flight, the variable area nozzle may maintain a substantially constant nozzle pressure ratio near an optimized nozzle pressure ratio as the aircraft transitions from rotary wing flight to fixed wing flight.

24 Claims, 4 Drawing Sheets

U.S. PATENT DOCUMENTS

| | | | |
|---|---|---|---|
| 4,828,173 A * | 5/1989 | Guerty | 239/1 |
| 4,848,701 A * | 7/1989 | Belloso | 244/12.5 |
| 4,978,071 A * | 12/1990 | MacLean et al. | 239/265.19 |
| 4,994,660 A * | 2/1991 | Hauer | 239/265.41 |
| 5,050,803 A * | 9/1991 | Wakeman et al. | 239/265.35 |
| 5,081,835 A * | 1/1992 | Ewing, Jr. | 60/230 |
| 5,092,525 A * | 3/1992 | Roach et al. | 239/265.29 |
| 5,454,530 A | 10/1995 | Rutherford et al. | |
| 5,516,060 A * | 5/1996 | McDonnell | 244/7 B |
| 5,690,280 A * | 11/1997 | Holowach et al. | 239/265.25 |
| 5,699,966 A * | 12/1997 | Beverage | 239/265.19 |
| 5,720,453 A * | 2/1998 | Platt | 244/23 D |
| 5,778,659 A * | 7/1998 | Duesler et al. | 60/226.1 |
| 5,788,181 A | 8/1998 | Wilson | |
| 5,791,601 A * | 8/1998 | Dancila et al. | 244/207 |
| 5,984,229 A * | 11/1999 | Hollowell et al. | 244/12.4 |
| 6,164,563 A * | 12/2000 | Bouiller et al. | 239/265.37 |
| 6,260,801 B1 * | 7/2001 | Peters et al. | 244/110 B |
| 6,289,670 B1 * | 9/2001 | Charier et al. | 60/230 |
| 6,311,928 B1 * | 11/2001 | Presz et al. | 244/110 B |
| 6,629,674 B1 * | 10/2003 | Saddoughi et al. | 244/207 |
| 6,786,040 B2 * | 9/2004 | Boehnlein et al. | 60/269 |
| 6,845,945 B1 * | 1/2005 | Smith | 244/110 B |
| 6,938,408 B2 * | 9/2005 | Lair | 60/226.2 |
| 7,568,348 B2 * | 8/2009 | McAllister et al. | 60/771 |
| 2002/0122717 A1 * | 9/2002 | Ghetzler et al. | 415/35 |
| 2004/0068975 A1 * | 4/2004 | Skowronski | 60/39.511 |
| 2005/0035215 A1 * | 2/2005 | Amaduzzi | 239/251 |
| 2005/0072876 A1 * | 4/2005 | Ducasse | 244/23 D |

\* cited by examiner

REACTION DRIVE ROTOR/WING VARIABLE AREA NOZZLE

BACKGROUND

Extensive effort has been devoted to development of aircraft that are capable of taking off, hovering, and landing like a helicopter—that is, in rotary wing flight mode—and that are also capable of high speed cruise—that is, fixed wing flight mode. A recent example of such an aircraft is the canard rotor/wing ("CR/W") aircraft. An exemplary CR/W aircraft is discussed in U.S. Pat. No. 5,454,530, the entire contents of which are hereby incorporated by reference.

A CR/W aircraft is propelled by a turbofan engine and a reaction drive system. During rotary wing flight, the turbofan engine's exhaust powers the rotor system through ducts to nozzles near the rotor tips. During conversion to fixed wing flight, the turbofan engine's exhaust is redirected from the reaction drive rotor tip nozzles aft to conventional nozzles. During this transition, residual exhaust continues to rotate the rotor, and a canard and horizontal tail provide lift for remaining aloft.

In some CR/W aircraft, the reaction drive rotor tip nozzles may include ducts that protrude beyond the airfoil boundary. In such an arrangement, the protruding, open ducts may increase aerodynamic drag during fixed wing flight. Further, gas flow is not choked during the transition from rotary wing flight to fixed wing flight. That is, nozzle pressure ratio is not optimized, thereby resulting in loss of flow specific thrust.

In other arrangements, the reaction drive rotor tip nozzles may include ducts that do not protrude beyond the airfoil boundary, and a pair of hinged nozzle flap doors may be incorporated into the airfoil boundary. Exemplary nozzle flap doors are discussed in U.S. Pat. No. 5,788,181, the entire contents of which are hereby incorporated by reference. The nozzle flap doors are fully opened during rotary wing flight and fully shut during fixed wing flight. Such an arrangement reduces aerodynamic drag during fixed wing flight. However, this arrangement does not overcome loss of specific flow thrust.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In a non-limiting, exemplary variable area nozzle, a fixed duct section has an inlet and an outlet that is oriented approximately perpendicular to the inlet. A controllable nozzle member is disposed adjacent the outlet of the fixed duct section, and the controllable nozzle member has an area that is adjustable to maintain a substantially constant nozzle pressure ratio.

According to an aspect, the controllable nozzle member may include first and second flap doors that are hinged and pivotable in opposite directions between an open position and a closed position. According to another aspect, the controllable nozzle member may include first and second flap doors that are further hinged and pivotable in a same direction such that thrust from gas exiting the nozzle is vectorable.

According to further aspects, the variable area nozzle may be disposed at ends of trailing edges of rotor blades of a rotor/wing. When such a rotor/wing is provided in an aircraft that is capable of rotary wing flight and fixed wing flight, the variable area nozzle may maintain a substantially constant nozzle pressure ratio near an optimized nozzle pressure ratio as the aircraft transitions from rotary wing flight to fixed wing flight, thereby helping to achieve increased flow specific thrust compared to conventional canard rotor/wing aircraft.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

By way of overview, in an exemplary variable area nozzle, a fixed duct section has an inlet and an outlet oriented approximately perpendicular to the inlet. A controllable nozzle member is disposed adjacent the outlet of the fixed duct section. The controllable nozzle member has an area that is adjustable to maintain a substantially constant nozzle pressure ratio. When disposed in rotor tips of an aircraft capable of rotary wing flight and fixed wing flight, the variable area nozzle may maintain a substantially constant nozzle pressure ratio near an optimized nozzle pressure ratio as the aircraft transitions from rotary wing flight to fixed wing flight. Details will be set forth below.

Figure 1:
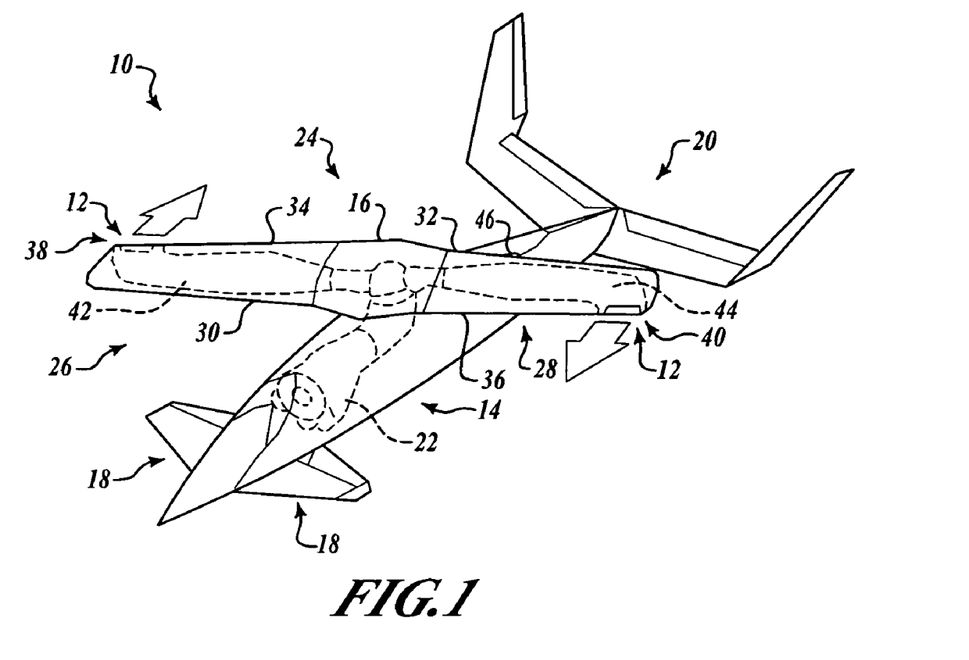
FIG. 1 is a perspective view of an exemplary canard rotor/wing aircraft including controllable area nozzles at its rotor tips.

Referring to FIG. 1, an aircraft 10 is capable of rotary wing flight and fixed wing flight and that advantageously includes controllable area nozzles 12. The aircraft 10 suitably is a type of aircraft referred to as a canard rotor/wing ("CR/W") aircraft that is discussed in U.S. Pat. No. 5,454,530, the entire contents of which are hereby incorporated by reference. A brief description of the aircraft 10 follows. However, because CR/W aircraft are known to those of skill in the art and for the sake of brevity, all details of the aircraft 10 need not be discussed. After a brief discussion of the aircraft 10, details of the controllable area nozzle 12 will be explained.

The aircraft 10 includes a fuselage 14 and a hub 16 mounted on top of the fuselage 14. A pair of canards 18 is mounted on the fuselage 14 forward of the hub 16 and a generally horizontal tail 20 is mounted on the fuselage 14 aft of the hub 16. A turbofan engine 22 (shown in phantom) is housed within the fuselage 14 generally under the hub 16.

A rotor/wing 24 is mounted to the hub 16. Rotor blades 26 and 28 extend outwardly from the hub 16. The rotor blades 26 and 28 have leading edges 30 and 32, respectively, and trailing edges 34 and 36, respectively. The controllable area nozzles 12 are located at tips 38 and 40 of the trailing edges 34 and 36 of the rotor blades 26 and 28, respectively. Ducts 42 and 44 (shown in phantom) extend along a spanwise axis within the rotor blades 26 and 28, respectively and are couplable via a butterfly valve (not shown) in fluid communication to receive exhaust gas from the turbofan engine 22. The rotor blades 26 and 28 and their components—that is the leading edges 30 and 32, the trailing edges 34 and 36, the tips 38 and 40, the ducts 42 and 44, and the nozzles 12—are similar. Thus, for the sake of brevity and clarity, subsequent discussions of one of the rotor blades 26 or 28 and its components will apply to the other rotor blade 28 or 26 and its components. The butterfly valve (not shown) is controlled by a flight management computer (not shown) that implements a thrust schedule. When the rotor/wing 24 is thus coupled to receive exhaust gas from the turbofan engine 22, the exhaust gas exits the controllable area nozzles 12 and rotates the rotor blades 26 and 28 as a reaction drive rotor, thereby permitting the aircraft 10 to take off, hover, fly, and land in rotary wing flight mode.

Nozzles 46 (one of which is shown in FIG. 1 on the port side of the aircraft 10 and the other on the starboard side of the aircraft 10 being hidden from view) also are couplable via the butterfly valve (not shown) in fluid communication to receive exhaust gas from the turbofan engine 22. When the nozzles 46 are thus coupled to receive exhaust gas from the turbofan engine 22, the exhaust gas exits aft via the nozzles 46, thereby providing forward thrust and permitting the aircraft 10 to fly in fixed wing flight mode. During fixed wing flight, the hub 16 and the rotor/wing 24 are locked at a desired position, and the rotor/wing 24 generates lift in a known manner.

The aircraft 10 takes off, hovers, and flies in rotary wing flight as described above. When the aircraft 10 transitions from rotary wing flight to fixed wing flight, the butterfly valve (not shown) redirects exhaust gas from the rotor/wing 24 to the nozzles 46. The canards 18 generate lift for the aircraft 10 during the transition to fixed wing flight.

Advantageously and as will be described in detail below, the controllable area nozzles 12 maintain a substantially constant nozzle pressure ratio near an optimized nozzle pressure ratio to provide a choked flow of exhaust gas, thereby helping to achieve increased flow specific thrust compared to conventional canard rotor/wing aircraft. In some embodiments, the flow specific thrust can be around twice that provided by a conventional canard rotor/wing aircraft. This can help the aircraft 10 to achieve faster speeds and/or lower fuel consumption than a conventional canard rotor/wing aircraft.

Now that an explanation has been given of an overview of an application for which the nozzles 12 are particularly well-suited, details of exemplary nozzles 12 will be set forth below.

Figure 2:
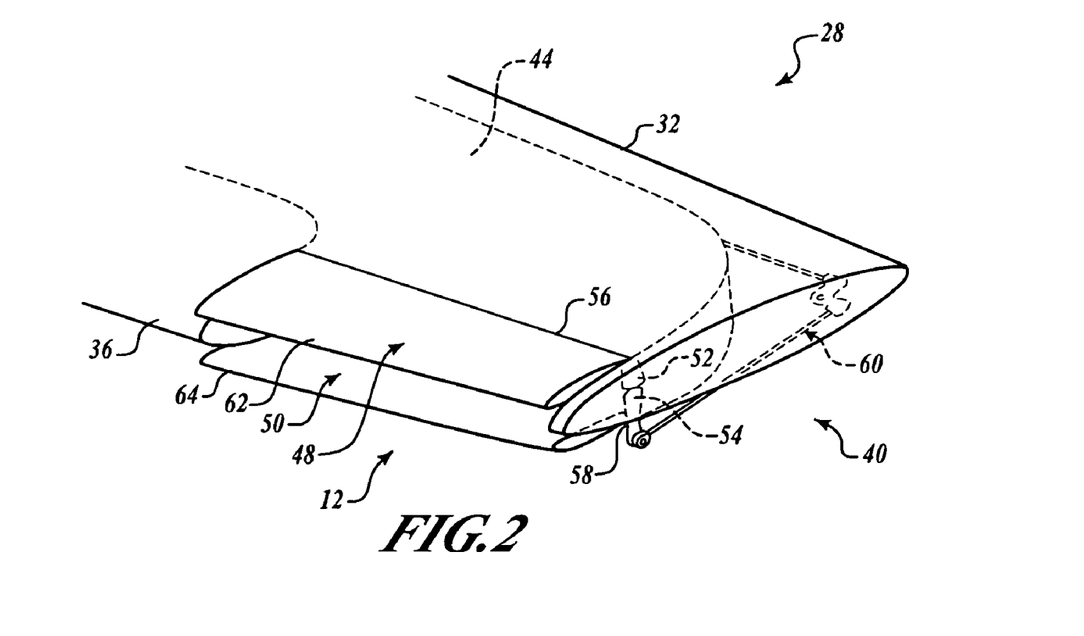
FIG. 2 is a perspective, partial cutaway view of an exemplary controllable area nozzle located at a rotor tip.

Referring now to FIG. 2 (showing only the rotor blade 28), a portion of the trailing edge 36 has been removed. In an exemplary embodiment the nozzle 12 includes a pair of flap doors 48 and 50 that are positioned along the trailing edge 36 toward the rotor tip 40 such that the flap doors 48 and 50 replace the portion of the trailing edge that has been removed.

Hinges 52 and 54 are mounted to spar structure (not shown) within the rotor blade 28 adjacent an outboard end of the duct 44. The flap doors 48 and 50 are mounted near their leading edges 56 and 58, respectively, to the hinges 52 and 54, respectively, symmetrically above and below the chord of the rotor blade 28. A longitudinal spanwise axis of the flap doors 48 and 50 is parallel to the spanwise axis of the rotor/wing 24. The length of the flap doors 48 and 50 is equalized toward the width of the outlets (not shown) of the duct 44 at the trailing edge 36.

An actuator 60 is operatively coupled to the hinges 52 and 54. In an exemplary embodiment, the actuator 60 suitably is a push rod. The use of push rods in helicopter rotor blades is well known. Therefore, a detailed discussion of operation of push rods is not needed. In an exemplary embodiment, the resultant push rod load may be grounded or reacted via an independent, electrically operated pushrod actuator (not shown) attached at the hub 16 or within the structure of the rotor/wing 24. Alternately, the pushrods may be controlled via a typical swashplate (not shown). In this alternate arrangement, the flap doors 48 and 50 are driven via a secondary swashplate independent of the primary swashplate employed for rotary wing control, since it is desirable to operate the flap doors 48 and 50 independent of the rotary wing collective and cyclic control system. To provide maximum operational flexibility, the flap doors 48 and 50 would not be slaved together via a coupled gear set. Independently actuating the flap doors 48 and 50 advantageously allows the flap doors 48 and 50 to be selectively controlled to either open or close the flap doors 48 and 50 or to vector the flap doors 48 and 50. The actuator 60 is not limited to push rods. In other exemplary embodiments, the actuator 60 can include an electric motor (such as a stepper motor) with a gearbox or a solenoid with a spring. If desired, the actuator 60 can be implemented with a smart material actuator, such as a Nitinol wire in combination with a means for heating the Nitinol wire, such as Joule heating or an externally applied heat source, or an actuator utilizing piezoelectric stacks.

Figure 3A:
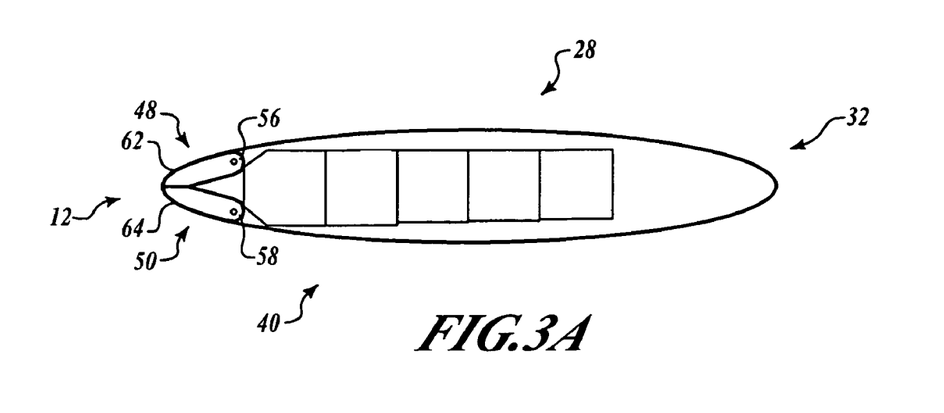
FIGS. 3A, 3B, and 3C are side views of exemplary controllable area nozzles in various operating conditions.

Referring now to FIGS. 2 and 3A, when the flap doors 48 and 50 are fully retracted (that is, closed), the resulting outer mold lined formed by trailing edges 62 and 64 of the flap doors 48 and 50 matches the airfoil profile of the trailing edge 36 of the rotor blade 28. By the flap doors 48 and 50 shutting tightly in this manner, the nozzle 12 advantageously reduces aerodynamic drag when the aircraft 10 is flying in fixed wing flight mode.

Figure 3B:
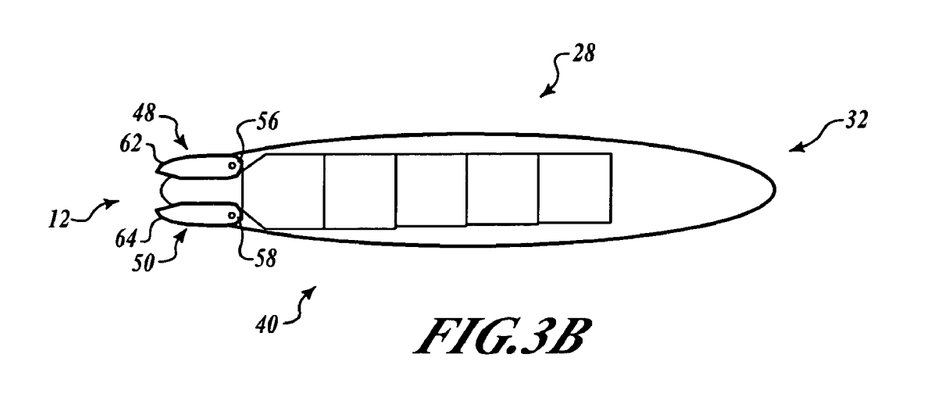

Referring now to FIGS. 2 and 3B, because the flap doors 48 and 50 are hinged near their leading edges 56 and 58, actuation via the actuator 60 causes trailing edges 62 and 64 of the flap doors 48 and 50 to rotate away from the chord line of the rotor blade 28. As a result, the flap doors 48 and 50 deploy symmetrically about the chord line of the rotor blade 28. In an exemplary embodiment, the flap doors 48 and 50 suitably rotate through approximately 30 degrees of travel. However, any amount of travel for the flap doors 48 and 50 can be selected as desired for a particular application depending upon desired total nozzle throat area, nozzle throat height, and flap span.

The nozzle flap doors 48 and 50 provide a controllable, variable area nozzle member. Deployment of the flap doors 48 and 50 exposes inner surfaces (not shown) of the flap doors 48 and 50, which act as a two-dimensional nozzle for the upstream gas duct 44. The inner surfaces (not shown) of the flap doors 48 and 50 suitably are contoured to vary nozzle throat height as a function of deployment angle of the flap doors 48 and 50. It is desirable to maintain a continuous, smooth geometry between the outlets (not shown) of the duct 44 and the inner surfaces (not shown) of the flap doors 48 and 50 to minimize flow separation. Advantageously, closing the flap doors 48 and 50 incrementally responsive to a thrust schedule, such as during the transition from rotary wing flight to fixed wing flight, reduces the exit area of the nozzle 12 to a value which can result in near optimized back pressure for a given operating condition. Further advantageously, regulation by the nozzles 12 (instead of the butterfly valve discussed above) of amount of exhaust gas permits the butterfly valve to be used for its intended purpose of a shutoff valve.

Figure 3C:
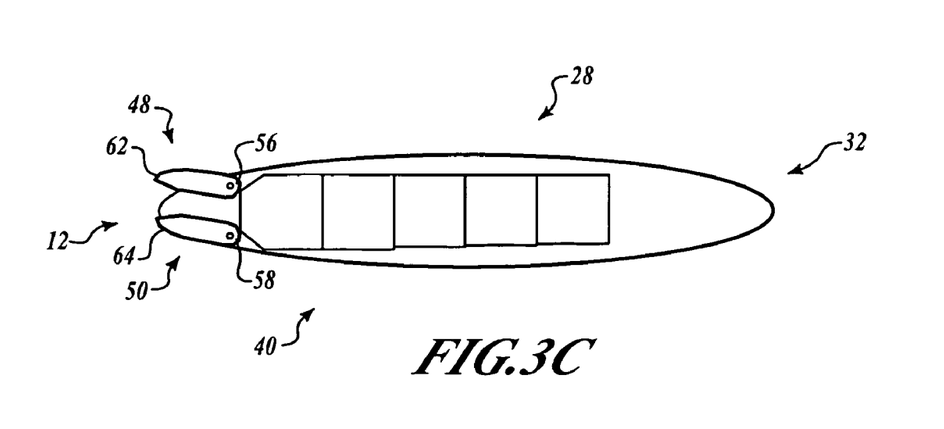

Referring now to FIGS. 2 and 3C, instead of the flap doors 48 and 50 being hinged and pivoting toward each other to effect the controlled variable area nozzle as described above, if desired the flap doors 48 and 50 advantageously may be hinged and pivoted in the same direction. The flap doors 48 and 50 may be hinged and pivoted in either clockwise or counterclockwise directions. Pivoting the flap doors 48 and 50 in the same direction advantageously provides for tip jet thrust vectoring. Thrust vectoring by the nozzles 12 can be used to augment thrust during rotary wing flight and fixed wing flight with a direct lift component, to force down the aircraft 10 (FIG. 1) in rotary flight mode without powering down the turbofan engine 22 (FIG. 1), to reduce steady pitching moments of the rotor/wing 24 during rotary wing flight, and to cancel vibration modes in the rotor/wing 24, if combined with a high bandwidth actuation method, such as a piezoelectric based actuator.

Figure 4A:
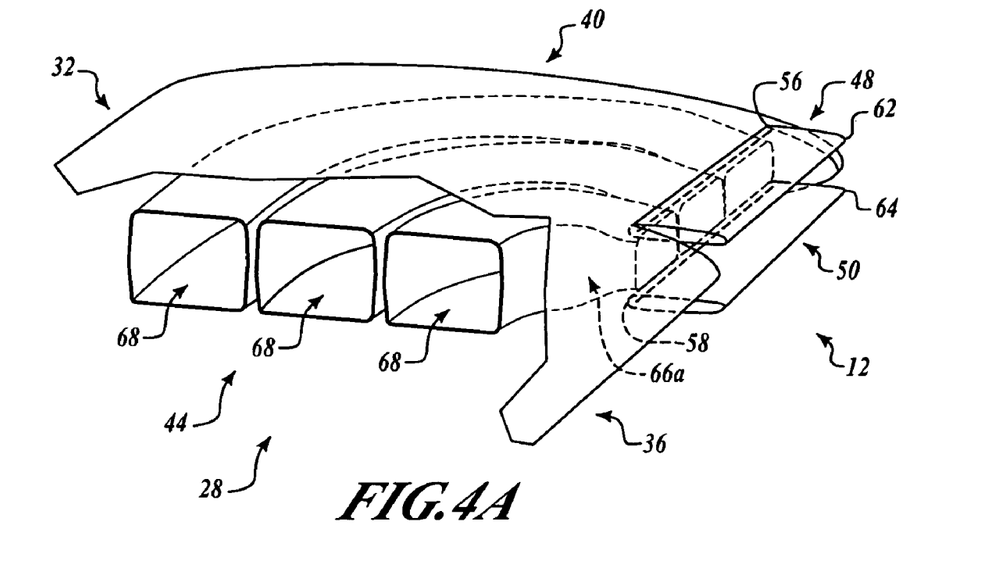
FIGS. 4A and 4B are partial cut-away perspective views of exemplary controllable area nozzles.

Referring now to FIG. 4A, the controllable area nozzle 12 can include a fixed duct section 66A made up of individual fixed nozzles. The fixed duct section 66A receives exhaust gas from the duct 44 after the exhaust gas has been turned approximately ninety degrees from the spanwise axis of the rotor blade 28. The exhaust gas exits the fixed duct section 66A toward the flap doors 48 and 50. The fixed duct section 66A suitably receives the exhaust gas from the duct 44 via several individual ducts 68 that turn the exhaust gas approximately ninety degrees from the spanwise axis of the rotor blade 28. The ducts 68 may have any shape as desired for a particular application. For example, the ducts 68 may have a rectangular cross section, as shown. However, the ducts 68 may also have a circular cross section (not shown), if desired.

Figure 4B:
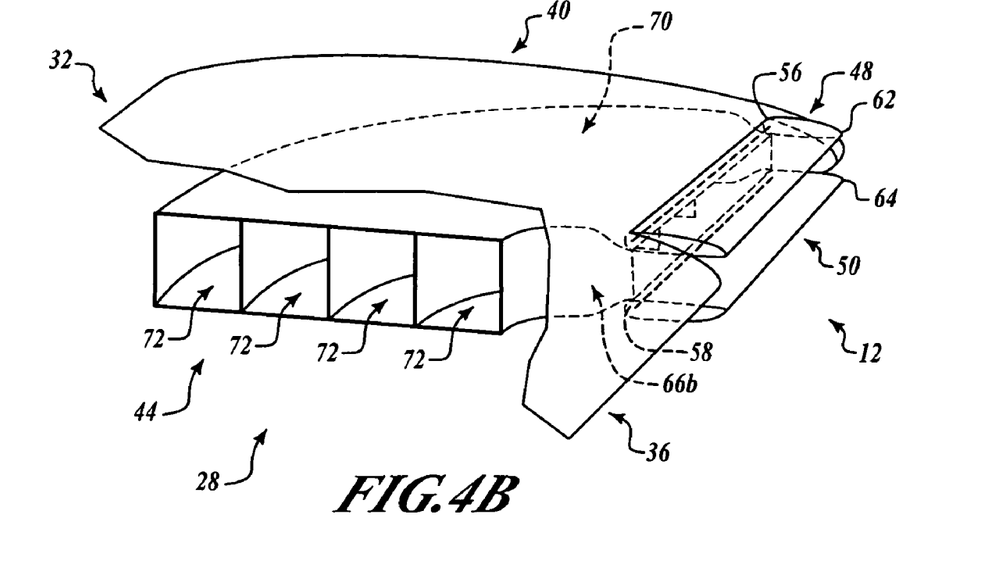

Alternately and referring now to FIG. 4B, a single fixed duct section 66B suitably receives the exhaust gas from the duct 44 via a turning vane box 70 that includes several turning vanes 72 that turn the exhaust gas approximately ninety degrees from the spanwise axis of the rotor blade 28. Use of the turning vane box 70 advantageously allows incorporating the large, single fixed duct section 66B as opposed to individual nozzles that make up the fixed duct section 66A.

Figure 5A:
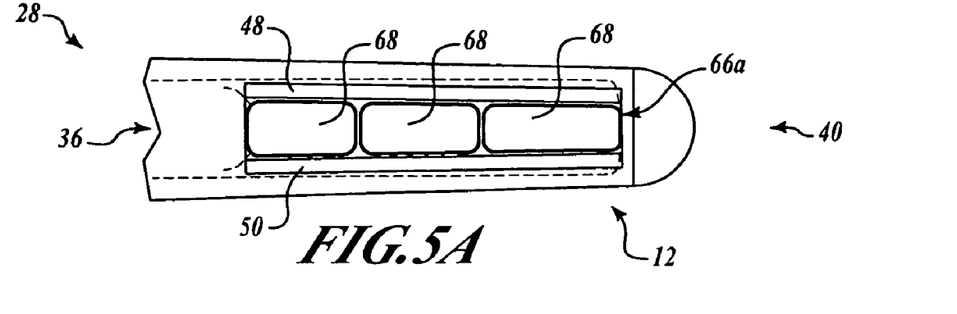
FIGS. 5A and 5B are partial cut-away side views of exemplary controllable area nozzles.
Figure 5B:
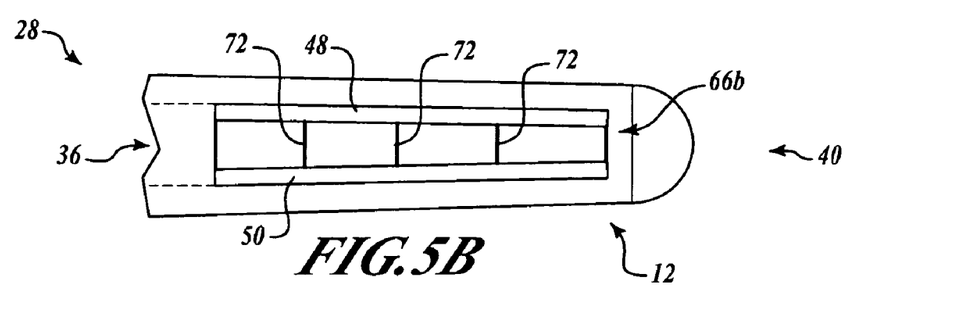

It is desirable to minimize any gap between exterior of the flap doors 48 and 50 and the fixed airfoil outer mold line surface of the rotor blade 28. Referring now to FIGS. 5A and 5B (looking toward the leading edge 36, through the flap doors 48 and 50, and into the ducts 68 (FIG. 5A) or the turning vanes 72 (FIG. 5B)), the exit shape dimensions of the upper and lower edges of the fixed duct sections 66A (FIG. 5A) and 66B (FIG. 5B), through the airfoil thickness, are determined by the desired exit area and a desire to maintain a constant distance from the airfoil outer mold line cutout boundary for the flap doors 48 and 50 to the fixed duct edge, along the full length of the controllable area nozzle 12. This constant offset results in a hinge line for the flap doors 48 and 50 that is centered equally along the length of the flap doors 48 and 50. The constant offset and hinge axis centering advantageously results in minimum gaps at the interface of the flap doors 48 and 50 and the airfoil outer mold line of the rotor blade 28 as well as no internal flow surface geometric discontinuities at the interface between the fixed duct section 66A (FIG. 5A) or 66B (FIG. 5B) and the flap doors 48 and 50. A constant distance is realized when the geometry of the fixed duct sections 66A (FIG. 5A) and 66B (FIG. 5B) through the thickness is parallel to the rotor/wing airfoil outer mold line flap door cut boundary.

Figure 6:
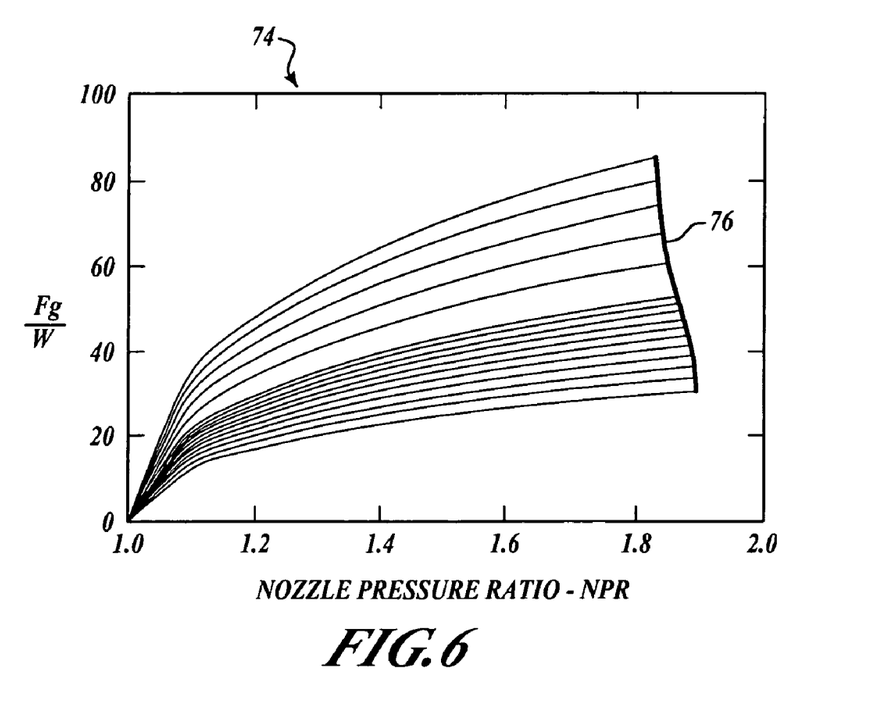
FIG. 6 is a graph of nozzle pressure ratio.

Referring now to FIG. 6, a graph 74 plots flow-specific thrust for several exhaust gas temperatures versus nozzle pressure ratio (NPR). The controllable area nozzle 12 (FIGS. 1 through 5B) maximizes momentum of exhaust gas exiting therefrom. Advantageously, at an NPR of approximately 1.89:1 as shown by a line 76, there is sufficient energy to accelerate the flow to sonic conditions. That is, the nearly-vertical line 76 represents choke flow occurring at NPRs between around 1.80 to around 1.90 for various exhaust gas temperatures. As the aircraft 10 (FIG. 1) transitions from rotary wing flight to fixed wing flight and the gas flow is reduced, the NPR for the controllable area nozzle 12 does not drop below the ratio for sonic flow conditions (along with resultant reductions in flow velocity and flow specific thrust) as does the NPR for fixed area nozzles in conventional CR/W aircraft. Instead, the flap doors 48 and 50 (FIGS. 2 through 5B) control flow area and therefore the thrust. This approach can maximize the flow-specific thrust of the controllable area nozzle 12 and can minimize total pressure loss. As long as power setting of the turbofan engine 22 (FIG. 1) results in an NPR that is high enough for choked flow in the ducts 42 and 44 (FIG. 2), then the flow-specific thrust will remain substantially constant at reduced flow rates.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A variable area nozzle comprising:
   a fixed duct section having an inlet and an outlet that is oriented substantially perpendicular to the inlet; and
   a controllable nozzle member disposed adjacent the outlet of the fixed duct section, the controllable nozzle member having a first flap door and a second flap door, wherein the first flap door and the second flap door present a smoothly contoured inner surface to vary a nozzle throat height and a nozzle pressure of the variable area nozzle based on a deployment angle of the first flap door and the second flap door, wherein the first flap door and the second flap door are each independently rotated by actuators in a first direction and in a second direction opposite of the first direction, wherein the first flap door and the second flap door are rotated in opposite directions to maintainable positions including an open position, a closed position and at least one intermediate position to vary the nozzle throat height and the nozzle pressure, and wherein the first flap door and the second flap door are rotated in a same direction to vector a flow of an exhaust gas in the first direction and in the second direction relative to the outlet of the fixed duct section.

2. The nozzle of claim 1, wherein an outlet area of the controllable nozzle member is controlled using the actuators to maintain a nozzle pressure ratio between 1.80:1 and 1.90:1.

3. The nozzle of claim 2, wherein the nozzle pressure ratio is maintained through a range of exhaust gas conditions.

4. The nozzle of claim 3, wherein the nozzle pressure ratio is maintained at about 1.89:1.

5. The nozzle of claim 1, wherein the actuators include a push rod.

6. The nozzle of claim 1, wherein the fixed duct section includes one of:
   a plurality of individual ducts; and
   a plurality of turning vanes.

7. The nozzle of claim 1, wherein the controllable nozzle member is adjusted based on a thrust schedule that relates the nozzle throat height to various exhaust gas conditions.

8. The nozzle of claim 1, wherein the actuators include an electric motor.

9. The nozzle of claim 1, wherein the actuators include a hydraulic actuator.

10. The nozzle of claim 1, wherein a first flap door interface hingeably joining the first flap door to the fixed duct section does not include internal, flow surface discontinuities.

11. The nozzle of claim 1, wherein the controllable nozzle member is controlled using the actuators independently of an exhaust valve that controls exhaust entering the fixed duct section.

12. The nozzle of claim 1, wherein, when the first flap door and the second flap door are positioned at the at least one intermediate position, the flow of the exhaust gas is at choked flow.

13. The nozzle of claim 12, wherein the first flap door and the second flap door are rotated to at least one second intermediate position between the open position and the closed position, and wherein when the first flap door and the second flap door are at the at least one second intermediate position, the flow of the exhaust gas is at choked flow.

14. A variable area nozzle comprising:
a fixed duct section having an inlet and an outlet that is oriented substantially perpendicular to the inlet and that is configured to route exhaust gases to supply thrust; and
a controllable nozzle member disposed adjacent the outlet of the fixed duct section and configured to direct the exhaust gases received from the fixed duct section, the controllable nozzle member comprising a first flap door and a second flap door, wherein a hinge axis of the first flap door is at a center of a first edge of the fixed duct section and the first flap door is smoothly contoured to the fixed duct section throughout a range of motion of the first flap door between a downward vector position and an upward vector position, and wherein a hinge axis of the second flap door is at a center of a second edge of the fixed duct section and the second flap door is smoothly contoured to the fixed duct section throughout a range of motion of the second flap door between the downward vector position and the upward vector position, wherein when the first flap door and the second flap door are rotated to the downward vector position, the first flap door and the second flap door direct a portion of the thrust downward, and wherein when the first flap door and the second flap door are rotated to the upward vector position, the first flap door and the second flap door direct a portion of the thrust upward;
wherein a nozzle area formed between the first flap door and the second flap door is controlled using actuators throughout a range of maintainable deployment angles of the first flap door and the second flap door to vary a nozzle throat height and nozzle pressure, wherein the range of maintainable deployment angles of the first flap door and the second flap door includes a fully open position and at least one partially open position.

15. The variable area nozzle of claim 14, wherein the first flap door and the second flap door are independently and incrementally rotated using the actuators.

16. The variable area nozzle of claim 15, wherein the first flap door and the second flap door are rotated in first opposite directions to increase the nozzle throat height and the nozzle pressure and are rotated in second opposite directions to decrease the nozzle throat height and the nozzle pressure.

17. The variable area nozzle of claim 16, wherein the first flap door and the second flap door are each moveable to a closed position, wherein in the closed position a second edge of the first flap door meets a second edge of the second flap door when the first flap door and the second flap door are rotated in the second opposite directions to the closed position.

18. The variable area nozzle of claim 17, wherein the first flap door is moved by a first actuator and the second flap door is moved by a second actuator.

19. The variable area nozzle of claim 18, wherein at least one of the first actuator and the second actuator includes a push rod.

20. The variable area nozzle of claim 18, wherein at least one of the first actuator and the second actuator includes an electric motor.

21. The variable area nozzle of claim 18, wherein at least one of the first actuator and the second actuator includes a hydraulic actuator.

22. The variable area nozzle of claim 14, wherein when the first flap door and the second flap door are deployed at the at least one partially open position, the exhaust gases are at choked flow.

23. A rotor/wing comprising:
a rotor having first and second rotor blades that extend from a middle section of the rotor toward first and second end sections of the rotor, respectively, the first and second rotor blades defining first and second ducts that extend from the middle section toward the first and second end sections, respectively, the first and second rotor blades each having a leading edge and a trailing edge; and
a variable area nozzle including:
a fixed duct section disposed in each of the first and second rotor blades at the trailing edges of the first and second end sections, each of the fixed duct sections having an inlet and an outlet that is oriented substantially perpendicular to the inlet; and
a controllable nozzle member disposed adjacent the outlet of a corresponding fixed duct section, the controllable nozzle member having a first flap door and a second flap door, wherein the first flap door and the second flap door present a smoothly contoured inner surface to vary a nozzle throat height and a nozzle pressure of the variable area nozzle based on a deployment angle of the first flap door and the second flap door, wherein the first flap door and the second flap door are each independently rotated by actuators in a first direction and in a second direction opposite of the first direction, wherein the first flap door and the second flap door are rotated in opposite directions to maintainable positions including an open position, a closed position and at least one intermediate position to vary the nozzle throat height and the nozzle pressure, and wherein the first flap door and the second flap door are rotated in a same direction to vector a flow of an exhaust gas in the first direction and in the second direction relative to the outlet of the corresponding fixed duct section.

24. An aircraft capable of rotary wing flight and fixed wing flight, the aircraft comprising:
a fuselage;
a rotor/wing including:
a hub disposed on an upper surface of the fuselage; and
a rotor attached to the hub, the rotor being rotatable during rotary wing flight and the rotor being lockable in a fixed position during fixed wing flight, the rotor including:

first and second rotor blades that extend from a middle section of the rotor toward first and second end sections of the rotor, respectively, the first and second rotor blades defining first and second ducts that extend from the middle section toward the first and second end sections, respectively, the first and second rotor blades each having a leading edge and a trailing edge;

a variable area nozzle including:
  a fixed duct section disposed in each of the first and second rotor blades at the trailing edges of the first and second end sections, each of the fixed duct sections having an inlet and an outlet that is oriented substantially perpendicular to the inlet; and
  a controllable nozzle member disposed adjacent the outlet of a corresponding fixed duct section, the controllable nozzle member having a first flap door and a second flap door, wherein the first flap door and the second flap door present a smoothly contoured inner surface to vary a nozzle throat height and a nozzle pressure of the variable area nozzle based on a deployment angle of the first flap door and the second flap door, wherein the first flap door and the second flap door are each independently rotated by actuators in a first direction and in a second direction opposite of the first direction, wherein the first flap door and the second flap door are rotated in opposite directions to maintainable positions including an open position, a closed position and at least one intermediate position to vary the nozzle throat height and the nozzle pressure, and wherein the first flap door and the second flap door are rotated in a same direction to vector a flow of an exhaust gas in the first direction and in the second direction relative to the outlet of the corresponding fixed duct section; and a canard disposed on the fuselage forward of the rotor/wing, the canard being configured to generate lift as the aircraft transitions from rotary wing flight to fixed wing flight.

* * * * *